(No Model.)
G. HIRSCHBACH.
PLUG TOBACCO CARRIER AND CUTTER.
No. 604,756. Patented May 31, 1898.
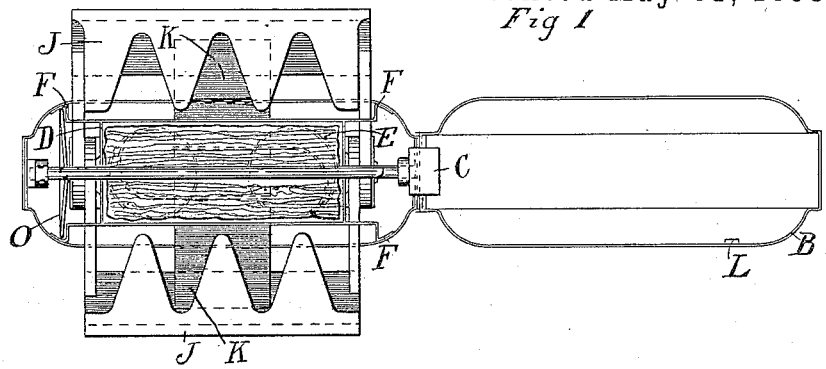
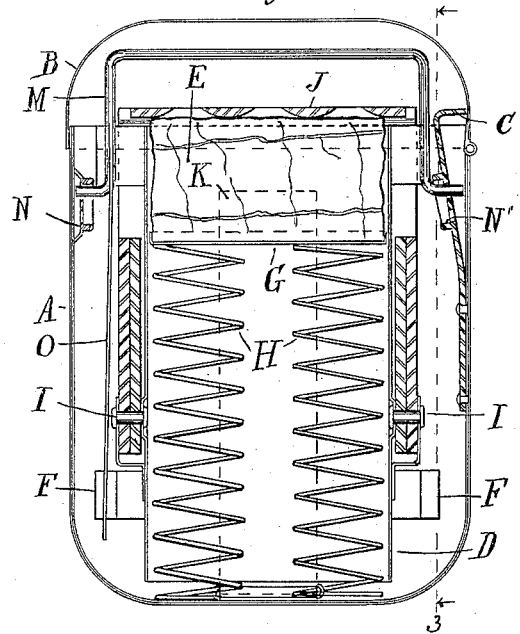
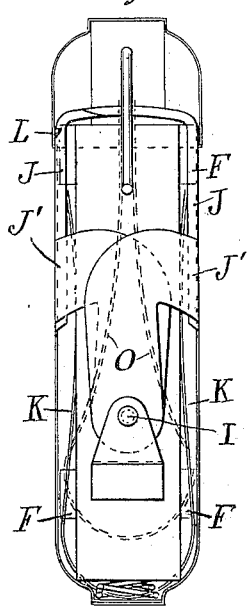
WITNESSES:
C. L. Belcher
M. H. Dumont
INVENTOR
Gustave Hirschbach
BY
Townsend & Decker
ATTORNEYS

UNITED STATES PATENT OFFICE.

GUSTAVE HIRSCHBACH, OF NEW YORK, N. Y.

PLUG-TOBACCO CARRIER AND CUTTER.

SPECIFICATION forming part of Letters Patent No. 604,756, dated May 31, 1898.

Application filed September 16, 1897. Serial No. 651,853. (No model.)

*To all whom it may concern:*

Be it known that I, GUSTAVE HIRSCHBACH, a citizen of the United States, and a resident of New York, in the county of New York and State of New York, have invented a certain new and useful Plug-Tobacco Carrier and Cutter, of which the following is a specification.

This invention relates to pocket-cases for tobacco, and particularly to such cases adapted to carry what is known as "plug-tobacco." One great objection raised against this form of chewing-tobacco is the inconvenience in carrying and particularly in severing chews from the plug. This objection may be overcome by the construction of a covered pocket-case having a device combined therewith for cutting off or severing from the contained tobacco such portions as may be desired for chewing without touching the plug with the fingers.

With this end in view the invention consists in the construction, combination, and arrangement of parts, substantially as hereinafter described, and set forth in the claims.

In the accompanying drawings, which form a part of this specification, Figure 1 represents in plan the case embodying my invention, the cover being thrown back. Fig. 2 is a vertical transverse section of the case with cover closed. Fig. 3 is a transverse section taken at right angles to that in Fig. 2 and on the plan indicated by line 3 3.

The outer case A of this device may be constructed in any suitable form and of any desired material such as will adapt it for carrying in the pocket. In the drawings this case is shown as provided with a hinged cover B, which is thrown open in the manner usual with pocket-cases—that is, by means of a spring, such as indicated at C. Within this outer casing is located an inner casing or guide D for the piece or plug of tobacco, a portion of the plug nearly consumed being indicated at E. This inner casing or guide may be secured to the outer casing in any suitable way, as by means of the projections or brackets F. Within this guide is placed the follower G, between which and the bottom of the outer casing are located suitable springs, as H.

Suitably secured within the outer casing— as, for instance, by pivoting or hinging to the inner casing, as at I—are located cutting blades or knives, such as J, which by preference are serrated, as shown, the serrations of one entering between those of the other with a shearing action. This construction and action of the cutting-blades is essential, as it makes the cutting of the tobacco easy, whereas with a straight blade it would be nearly impossible to cut through a plug of tobacco. These blades close together over the upper end of casing D and serve to confine the plug in said casing. The vertical portions of these blades form part of the wall of the outer casing, as indicated in Fig. 2. This is to provide for the separation of the knives to allow the plug to project beyond them, suitable arms, as J', extending inward from the main portions of the blades and being pivoted at I, as previously stated. A suitable spring, as K, is located within the outer casing and bears at its ends against said blades for forcing them outward. The cover B sets down over the upper ends of the blades and confines them within the casing, as indicated in Fig. 3. Upon one of these springs may be formed, in connection with a lug, as L, upon the cover, a catch for holding said cover in closed position. Any other suitable catch may be used for this purpose, as desired.

In order to gage the amount of tobacco to be cut from the plug, a suitable stop of any desired form and construction may be employed. One form for such stop is indicated in the drawings, and consists of a bail-shaped wire M, whose ends may be located in suitable ears within the casing A. One of these ears, as N, is shown secured directly to the casing, while the other one, N', is shown as formed upon the spring C. In these ears one or more holes may be formed whereby the stop may be adjusted to a greater or less distance from the end of the casing D. In order to maintain this bail in an upright position, various means may be provided, the one here suggested consisting of a wire loop, as O, the ends of which are soldered or otherwise connected to the bail M, the loop portion of said wire engaging the sides of the case A, so as to maintain the bail in an upright position. To insert a plug of tobacco in this casing, the blades J are pressed together to release the cover from the catch L, (it being then thrown back by the spring C.) Pressure upon the blades being then released the spring K forces them apart, when by moving the bail M to one side the plug may be pressed down into the casing D against the pressure of springs H, the blades being then pressed together over the plug and the cover closed. With the plug thus housed it may be carried in the pocket without danger of dust being admitted thereto and without danger of its soiling the pocket. To cut off a piece of the plug, it is simply necessary to press the blades J slightly together, when the cover will fly back. Then upon releasing the pressure upon the blades the plug will pass beyond them against the stop or bail M, when by pressing the blades together they will penetrate the plug and cut off the piece between them and the bail. This piece may then be removed and the cover closed. In this way the plug may be readily cut without soiling the fingers or without having to carry a pocket-knife for the special purpose.

Many changes may be made in the formation of the parts and in their arrangement and combination without departing from the spirit of this invention.

What I claim as my invention is—

1. A pocket-case for tobacco having a pair of serrated cutting-blades combined therewith and coöperating to cut off slices of the tobacco, the serrations of one blade intermeshing with those of the other with a shearing action for the purpose set forth.

2. A pocket-case for "plug-tobacco" having a cutting device combined therewith, means for forcing the plug into position to be cut, and a stop or guard for limiting the movement of the plug, said cutting device consisting of coöperating serrated blades closing together under said stop.

3. A pocket-case for plug-tobacco consisting of the combination with the outer case A, B, of an inner case or guide D, for a plug of tobacco, the pair of cutting-blades J, located within the outer case and operable from the exterior thereof, the vertical portion of the blades forming part of the wall of the outer case and means for moving the end of the plug past said blades for the purpose set forth.

4. A pocket-case for plug-tobacco consisting of the combination with the outer covered case A, B, and the plug case or guide D, of springs for forcing the plug outward, an adjustable stop M, for limiting the movement of the plug, a spring as O, for holding said stop in vertical position and a cutting device within the outer case and operable through the walls thereof for severing the desired piece from the plug.

5. The combination with the outer case, of the inner case for a plug of tobacco, the serrated blades hinged within the outer case and adapted to close over the end of the plug, springs for forcing the blades apart, and means for projecting the end of the plug beyond the blades for the purpose set forth.

6. The combination with the outer casing having a hinged cover, of the blades for severing the plug provided with a catch for holding the cover closed, substantially as set forth.

7. The combination with the outer casing, of the plug-guide therein, the spring-follower in said guide, the outwardly-spring-pressed cutting-blades adapted to close over the end of the plug and to be confined in such position by the cover when closed, substantially as and for the purpose set forth.

8. The "plug-tobacco" case consisting of the outer casing having a suitable cover, the inner casing provided with a spring-follower for the plug, the spring-separated blades adapted to cut through the plug, and the stop for limiting the outward movement of the plug, substantially as and for the purpose set forth.

Signed at New York, in the county of New York and State of New York, this 15th day of September, A. D. 1897.

GUSTAVE HIRSCHBACH.

Witnesses:
M. H. DUMONT,
ROLAND GREEN.